US 6,557,434 B2

(12) United States Patent
Armstrong et al.

(10) Patent No.: US 6,557,434 B2
(45) Date of Patent: May 6, 2003

(54) STEERING COLUMN TILT ASSEMBLY

(75) Inventors: Ray Garnet Armstrong, Bay City, MI (US); James Anthony Smazenka, Midland, MI (US); Richard Kremer Riefe, Saginaw, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/824,525

(22) Filed: Apr. 2, 2001

(65) Prior Publication Data
US 2002/0139216 A1 Oct. 3, 2002

(51) Int. Cl.⁷ .................................................. B62D 1/18
(52) U.S. Cl. ............................. 74/495; 74/493; 280/775
(58) Field of Search ........................ 74/493, 495, 528, 74/529, 533, 534, 535, 536, 537, 555; 123/508; 280/775, 776, 777; 29/516

(56) References Cited
U.S. PATENT DOCUMENTS 4,594,909 A * 6/1986 Yamaguchi .................. 74/493
4,938,093 A * 7/1990 Matsumoto et al. .......... 74/493
5,143,402 A * 9/1992 Higashino et al. .......... 280/775
5,452,624 A * 9/1995 Thomas et al. ............... 74/493
5,566,585 A * 10/1996 Snell et al. ............. 280/775 X
6,282,977 B1 * 9/2001 Satoh et al. .................. 74/493

FOREIGN PATENT DOCUMENTS

JP        62-74765      *  4/1987

* cited by examiner

Primary Examiner—Thomas R. Hannon
Assistant Examiner—Colby Hansen
(74) Attorney, Agent, or Firm—Edmund A. Anderson

(57) ABSTRACT

The steering column tilt assembly has a tilt housing that is pivotally attached to a fixed housing. A fixed shoe is attached to the fixed housing. A pivoted shoe is pivotally attached to the tilt housing. A shoe release lever has a wedge surface that holds the pivoted shoe in engagement with a fixed shoe when in a locked position. The shoe release lever has two trunions that are received in bores in the tilt housing. A release lever slot between the bores receive the pivot end shank portion. An open quadrant of the lower bore portion permits the shank portion to be moved into the slot. A spring urges the shoe release lever toward the locked position.

10 Claims, 8 Drawing Sheets

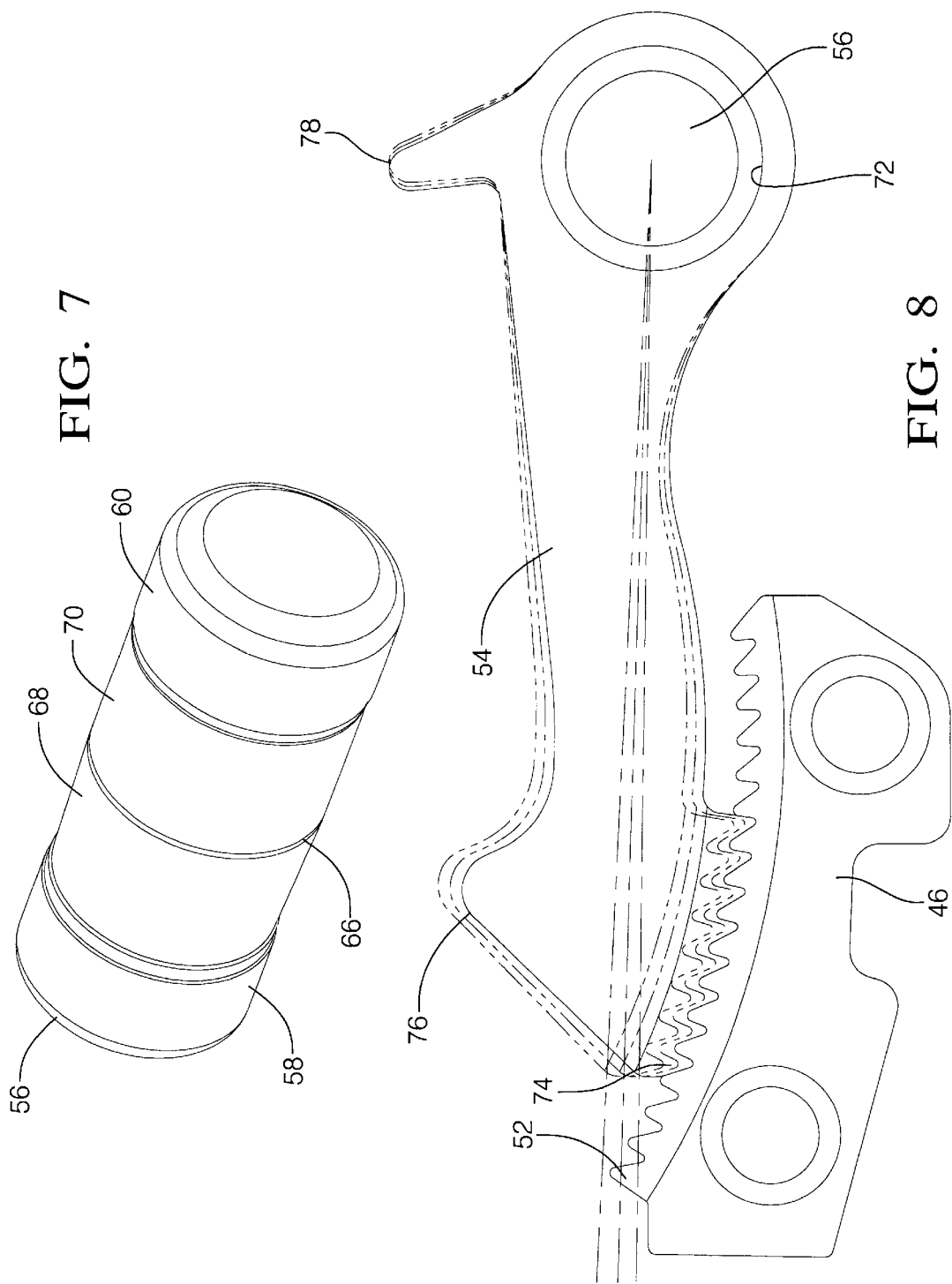

STEERING COLUMN TILT ASSEMBLY

TECHNICAL FIELD

The steering column tilt assembly for a vehicle includes the housing that accepts a shoe release lever, with a pair of integral trunions, that can be manually attached and pivoted into an operating position without the employment of tools or fixtures.

BACKGROUND OF THE INVENTION

Steering columns with tilt assemblies have been employed for many years. Vehicle operators find steering wheels with an adjustable height a desirable feature. As a result, most motor vehicles manufactured in North America today have adjustable height steering wheels. Farm machinery such as tractors and self propelled harvesters also have adjustable position steering wheels.

One steering assembly tilt housing that has been manufactured for several years has a shoe release lever that acts upon three springs during operation. One spring urges the shoe release lever toward an unlocked position and toward contact with two tilt lock pivoted shoes. Each of the other two springs bias one of the pivoted shoes toward a locked position. A separate shoe release lever pivot pin pivotally attaches the shoe release lever to the tilt housing.

One of the two pivoted shoes receives a fixed housing pin between two pivoted shoe bars at any given time to lock the tilt housing in a fixed position. The other shoe is held in an unlocked position by contact between the edge of a bar and the fixed housing pin. As a result, each one of the springs that biases a pivoted shoe toward a locked position must exert sufficient force to hold one of the pivoted shoes in a locked position and to simultaneously overcome the force of the one spring that urges the shoe release lever toward an unlocked position.

During assembly of these known steering column tilt assemblies all three springs must be compressed and the passage through the shoe release lever has to be aligned with passages in the tilt housing before the release lever pivot pin can be inserted. It is possible for most individuals to compress all three springs, align the pivot pin apertures and then insert the release lever pivot pin manually. However, the task is time consuming. Due to the stress on the fingers, hands, and arms only a limited number of release lever pivot pins can be installed per day. To relieve the stress that results from manual assembly, fixtures are used which compress the springs and align the apertures when pivotally attaching a shoe release lever to a tilt housing. This use of an assembly fixture reduces strain on assembly personnel but does not significantly reduce tilt housing unit assembly time.

SUMMARY OF THE INVENTION

The steering column tilt assembly includes a fixed housing and a tilt housing pivotally attached to the fixed housing for pivotal movement about a tilt axis. A fixed shoe is attached to the fixed housing. A pivoted shoe is pivotally attached to the tilt housing for pivotal movement about a shoe pivot axis that is parallel to the tilt axis. A shoe release lever has a pivoted end shank portion with an integral bottom trunion and an integral top trunion that is coaxial with the integral bottom trunion and a trunion axis, a center section with a shoe wedge surface, and a handle end. A shoe release lever slot is formed in the tilt housing. A release lever bore in the tilt housing includes an upper bore portion on a first side of the shoe release lever slot receives the integral top trunion. A lower bore portion on a second side of the shoe release lever slot that receives the integral bottom trunion. The lower bore portion has an open quadrant that permits passage of the pivoted end shank portion into the shoe release lever slot. At least one spring urges the shoe release lever to pivot about the trunion axis toward a shoe locked position in which the shoe wedge surface engages the pivoted shoe and holds the pivoted shoe in engagement with the fixed shoe.

BRIEF DESCRIPTION OF THE DRAWINGS

The presently preferred embodiment of the invention is disclosed in the following description and in the accompanying drawings, wherein:

FIG. 7 is a perspective view of the shoe pivot pin;

FIG. 8 is an enlarged side view of the steering column tilt assembly lock fixed shoe and pivoted shoe;

DETAILED DESCRIPTION OF THE PREFERRED EMBODIMENT

Figure 1:
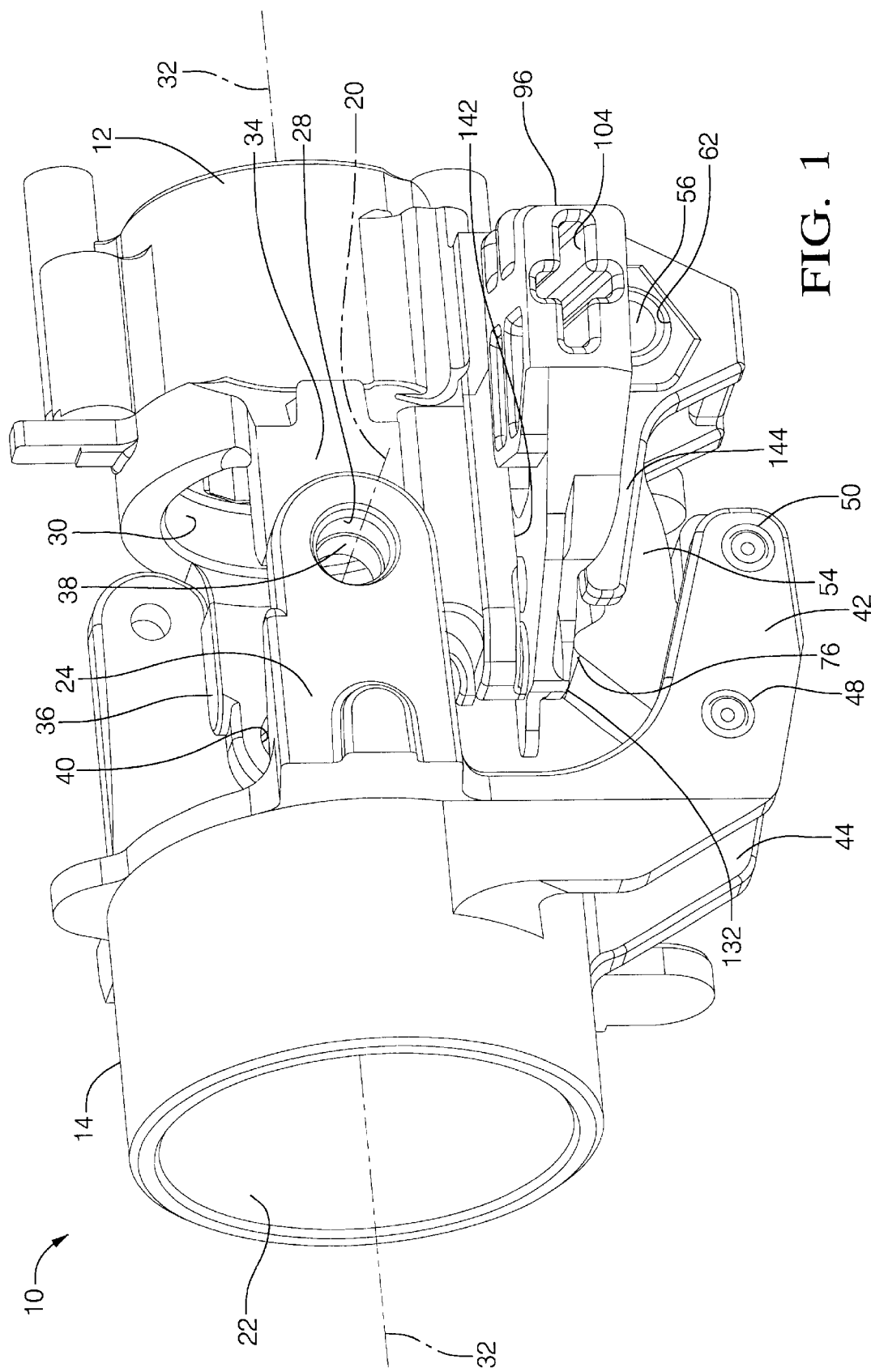
FIG. 1 is a perspective view of the steering column tilt assembly with the pivot pins removed.
Figure 2:
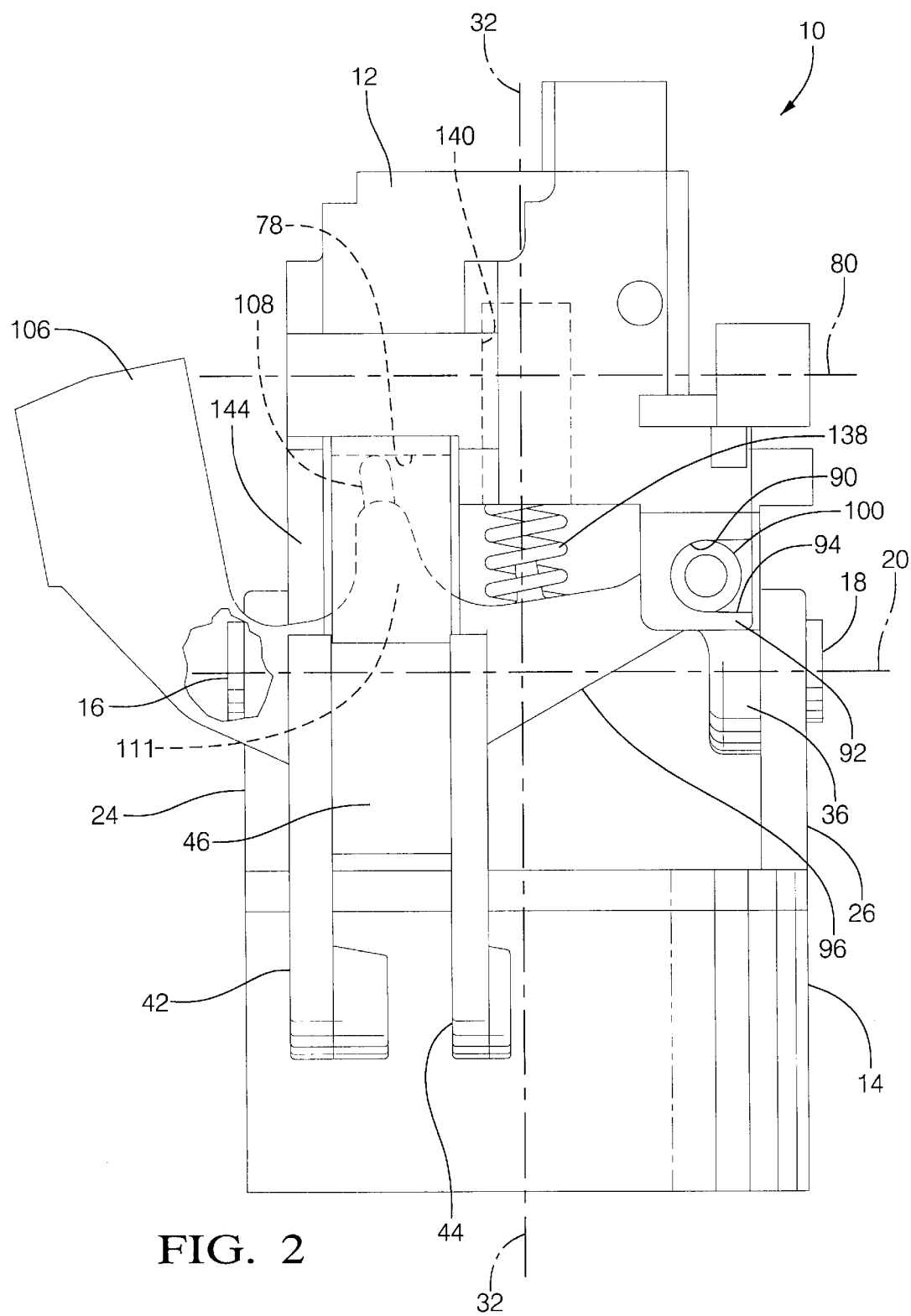
FIG. 2 is a bottom view of the steering column tilt assembly with parts broken away.

The terms left, right, front, rear, top and bottom, as used in the description of the preferred embodiment are as seen by a vehicle driver in a normal operators position in an vehicle using the steering column tilt housing shown in the drawing.

The steering column tilt assembly 10 for a vehicle steering column has a tilt housing 12 and a fixed housing 14. A pair of housing pins 16, and 18 pivotally attach the tilt housing 12 to the fixed housing 14 for pivotal movement about a tilt axis 20 relative to each other. The fixed housing 14 has a jacket assembly bore 22 which telescopically receives the upper end of a jacket assembly. The jacket assembly bore 20, as shown, receives a cylindrical upper end of the jacket assembly. The size and shape of the jacket assembly bore 22 can be modified as required to accommodate the size and shape of the jacket assembly to which the fixed housing 14 is to be attached. The fixed housing 14 can also be modified to employ a housing to jacket attaching system without a jacket assembly bore 22. A left fixed housing ear 24 and a right fixed housing ear 26 are integral with the fixed housing 14. Pivot pin bores 28 through the left ear 24 and the right ear 26 are coaxial with the tilt axis 20.

The tilt housing 12 has an upper steering shaft bearing bore 30. The bearing bore 30 generally receives two upper steering shaft bearings. However, the bearing bore 30 can be modified to house any bearing system that is used. The bearing bore 30 is coaxial with an upper steering shaft axis 32. The tilt axis 20 is transverse to and intersects the upper steering shaft axis 32.

A left tilt housing ear 34 and a right tilt housing ear 36 extend forwardly toward the fixed housing 14. The left tilt housing ear 34 has a left pivot pin bore 38. The right tilt housing ear 36 has a right pivot pin bore 40. The left pivot pin 16 is received in the pivot pin bore 28 through the left fixed housing ear 24 and the pivot pin bore 38 through the left tilt housing ear 34. The right pivot pin 18 is received in the pivot pin bore 28 through the right fixed housing ear 26 and the pivot pin bore 40 to the right tilt housing ear 36. Both pivot pins 16 and 18 are coaxial with the tilt axis 20. Pivot pins 16 and 18 may be retained by a press fit or by a threaded retainer system.

Spaced apart fixed shoe support arms 42 and 44 are integral with the fixed housing 14. A fixed shoe 46 is secured to the support arms 42 and 44 by pins 48 and 50. The fixed shoe 46 has a plurality of fixed teeth 52 that face toward the tilt axis 20. The tips of the fixed teeth 52 are on an arc about the tilt axis 20.

A pivoted shoe 54 is pivotally attached to the tilt housing 12 by shoe pivot pin 56. The shoe pivot pin 56 has cylindrical end portions 58 and 60. The cylindrical end portion 58 is received in a bore 62 in the tilt housing 12. Cylindrical end portion 60 is received in a bore 64 in the tilt housing 12. A center portion 66 of the pivot pin 56 has the same diameter as the cylindrical end portions 58 and 60. A surface 68 between the center portion 66 and the cylindrical end portion 58 is a frustoconical surface with its large diameter end adjacent to the center portion 66. The surface 70 between the center portion 66 and the cylindrical in portion 60 is a frustoconical surface with its large diameter end adjacent to the center portion 66. The shoe pivot pin 56 passes through a cylindrical bore 72 through the pivoted shoe 54. A plurality of pivoted teeth 74 on a free end of the pivoted shoe 56 engage fixed teeth 52 on the fixed shoe 46 when the tilt housing 12 is locked in a fixed position relative to the fixed housing 14. The frustoconical surfaces 68 and 70 on the shoe pivot pin 56 permit the pivoted teeth 74 to move into full contact with the fixed teeth 52. If desired, the bore 72 through the pivoted shoe 54 could be non-cylindrical and the shoe pivot pin 56 could be cylindrical. Either arrangement would permit improved alignment between the fixed teeth 52 and the pivoted teeth 74. Improved alignment increases the strength of the fixed shoe 46 and the pivoted shoe 54. The pivoted shoe 54 has a cam lobe 76 on its free end and a stop arm 78 that extends generally radially from the pivoted shoe pivot axis 80. The function of the stop arm 78 and the cam lobe 76 is explained below.

Figure 3:
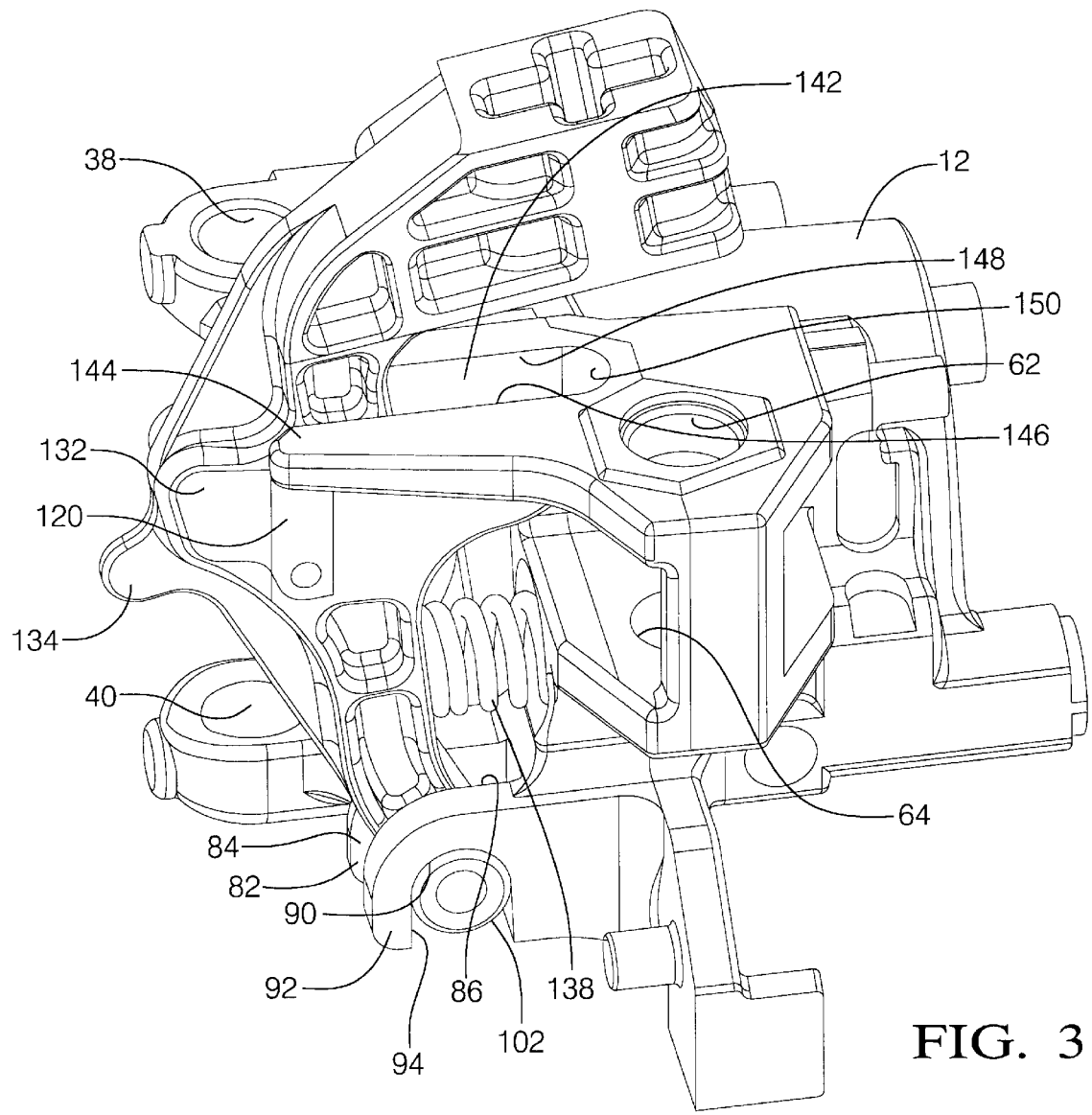
FIG. 3 is a perspective view of the bottom and left side of the tilt housing and the shoe release lever.
Figure 4:
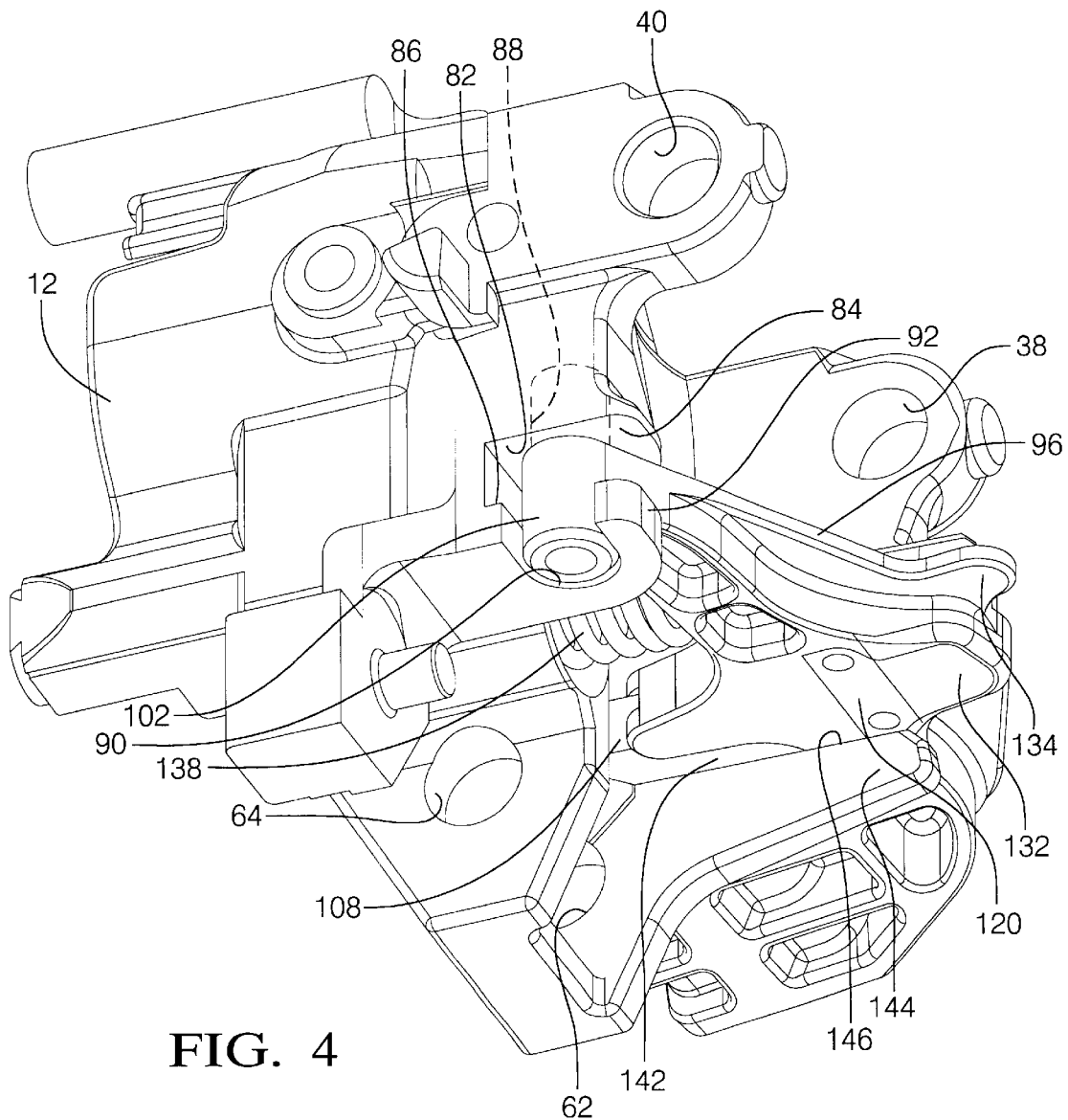
FIG. 4 is a perspective view of the bottom and right side of the tilt housing and the shoe release lever.
Figure 5:
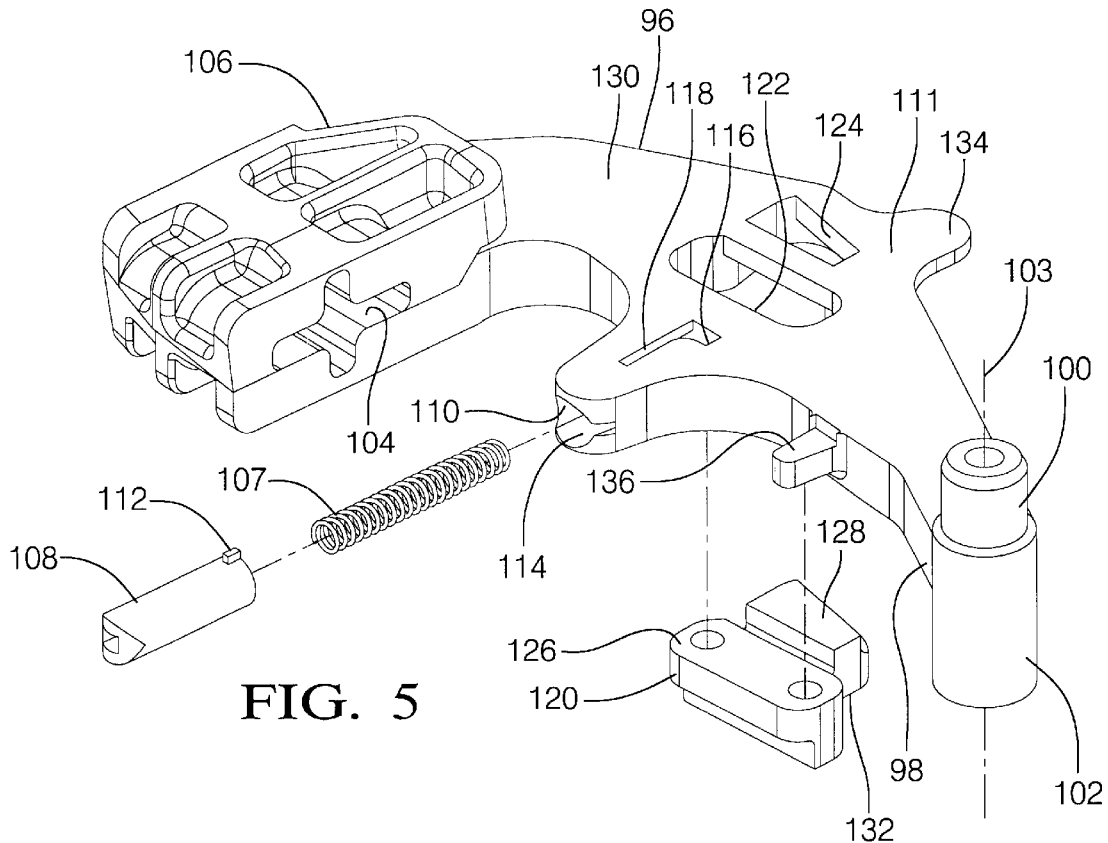
FIG. 5 is an expanded perspective view of the shoe release lever assembly.
Figure 6:
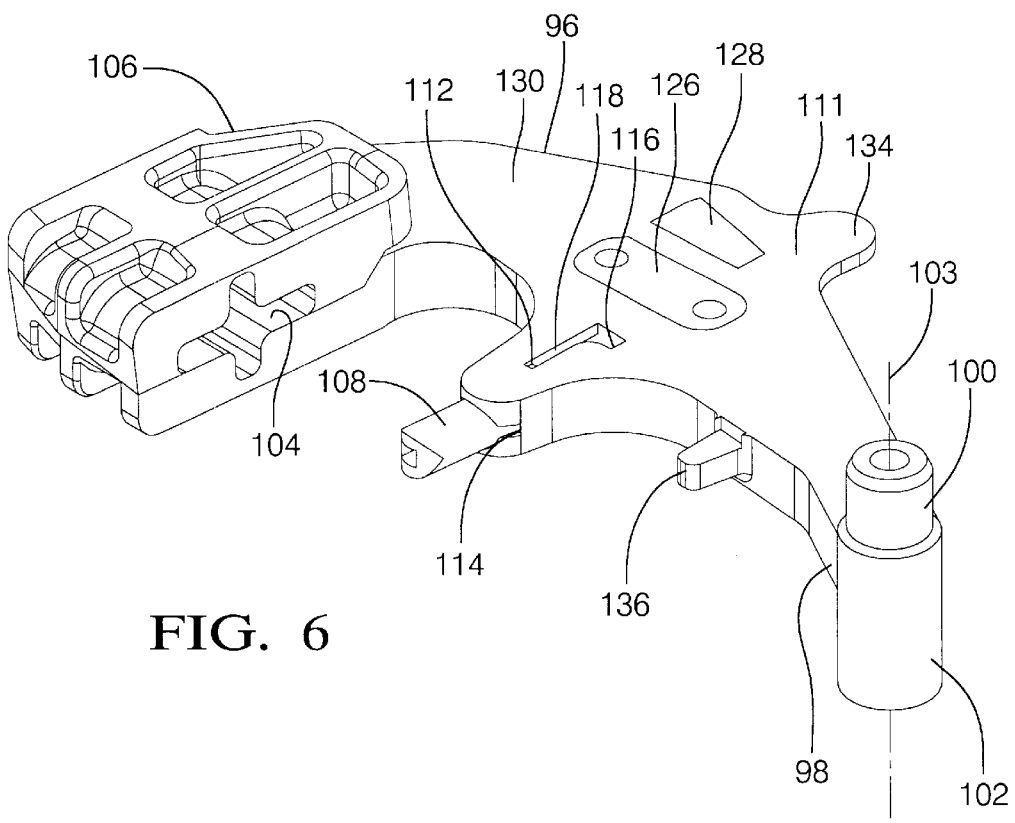
FIG. 6 is a perspective view of the shoe release lever assembly.

The tilt housing 12 has a generally horizontal release lever pivot pin end slot 82 with an upper wall 84 and a lower wall 86 as shown in FIGS. 3, 4, and 5. A release lever bore in the tilt housing 12 extends across the slot 82 and has an upper bore portion 88 that intersects the upper wall 84. A lower bore portion 90 of the release lever bore is coaxial with the upper portion 88 and extends through an ear 92 that forms the bottom wall of the pivot end slot 82. An open quadrant 94 of the lower bore portion 90 is provided in the right side of the ear 92. The upper bore portion 88 preferably has a smaller diameter than the lower bore portion 90.

A shoe release lever 96, as shown in FIG. 5, is a composite material such as nylon filled with glass and reinforced with powdered metal or steel inserts where required for strength. A pivoted end shank portion 98 of the shoe release lever 96 carries a top trunion 100 and a bottom trunion 102 that is coaxial with the top trunion and a trunion axis 103. The top trunion 100 has a smaller diameter than the bottom trunion 102. A handle mounting passage 104 is provided on the handle or free end 106 of the shoe release lever 96. A manual operating handle (not shown) is received in the passage 104.

A compression spring 107 and a force pin 108 are mounted in a bore 110 in the center section 111 of the shoe release lever 96. To the mount spring 107 and a pin 108 in the bore 110, the spring is inserted into the bore 110. Then a tab 112 on the pin 108 is positioned in an axial slot 114 in the bore 110 and the pin is forced into the bore and the spring is compressed. After the tab 112 is aligned with a radial slot 116, the force pin 108 is rotated to move the tab into alignment with the closed end slot 118 and the force pin 108 is released. The tab 112 is prevented from rotating by the sides of the slot 118 and retains the compression spring 106 and the force pin 108 as long as the tab remains out of alignment with the radial slot 116.

A steel wedge insert 120 is secured in the apertures 122 and 124 when the shoe release lever 96 is molded. The wedge insert 120 is shown separately in FIG. 5 for illustration only. Coplanar surfaces 126 and 128 provide contact surfaces that limit wear of the composite material surface 130. A wedge surface 132 is provided on the bottom of the wedge insert 120. Once the wedge insert 120 is molded into the shoe release lever 96, it cannot be removed without destroying the release lever due to the shape of the wedge insert.

A noise reduction tab 134 is integral with one side of the shoe release lever 96. An auxiliary compression spring alignment projection 136 is integral with a side of the shoe release lever 96 opposite the noise reduction tab 134. An auxiliary compression spring 138 is mounted in a bore 140 in the tilt housing 12 and applies force to the shoe release lever 96 as explained below.

During assembly, the top trunion 100 of the shoe release lever 96 is inserted into the upper bore portion 88 and the pivoted end 98 of the release lever 96 simultaneously passes through the open quadrant 94 in the ear 92. When the top trunion 100 is full inserted into the bore portion 88, the bottom trunion 102 is in the lower bore portion 90 with the open quadrant 94 and the pivoted end 98 of the release lever 96 is aligned with the release lever pivoted end slot 82. With the top trunion 100 full inserted into the upper bore 88, the shoe release lever 96 can be pivoted about the trunion axis 103 in a clockwise direction to an operating position as shown in FIGS. 3 and 4. This pivotal movement moves the force pin 108 into contact with the stop arm 78 and compresses the spring 107. The spring 107 urges the pivoted shoe 54 to rotate clockwise about the shoe pivot axis 80 from the position shown in FIG. 8 and to move the pivoted teeth 74 from engagement with the fixed teeth 52. Spring 107 also urges the shoe release lever 96 to pivot about the trunion axis 103 toward a shoe locked position shown in FIGS. 9a and 9b. Pivotal movement of the shoe release lever 96 during assembly also moves the projection 136 into the auxiliary compression spring 138 and compresses the auxiliary spring.

Figure 9:
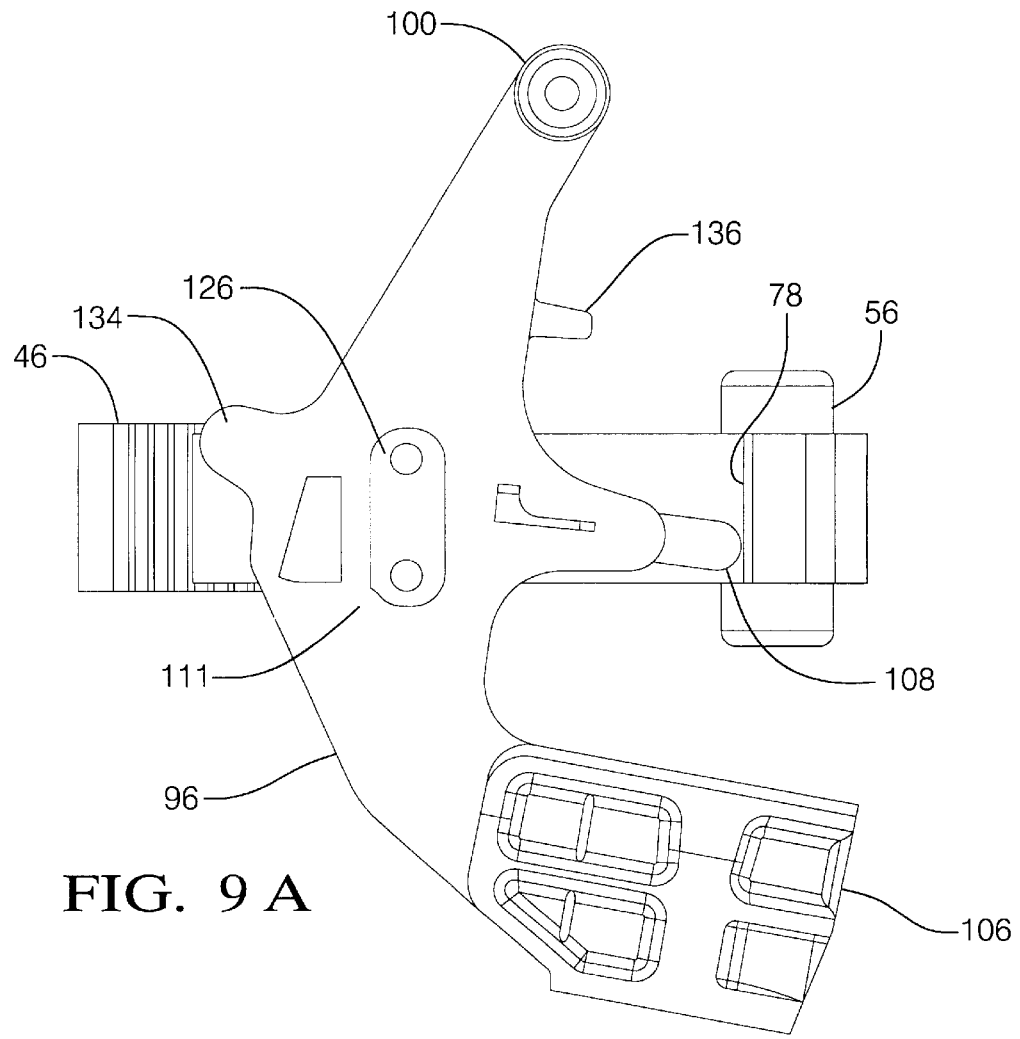
FIG. 9a is a plan view of the pivoted shoe, the fixed shoe, and the shoe release lever in a locked position.
FIG. 9b is a side view of the pivoted shoe, the fixed shoe, and the shoe release lever in a locked position.
FIG. 9c is a plan view of the pivoted shoe, the fixed shoe and the shoe release lever in an unlocked and released position.
FIG. 9d is a side view of the pivoted shoe, the fixed shoe, and the shoe release lever in an unlocked and released position.
Figure 9:
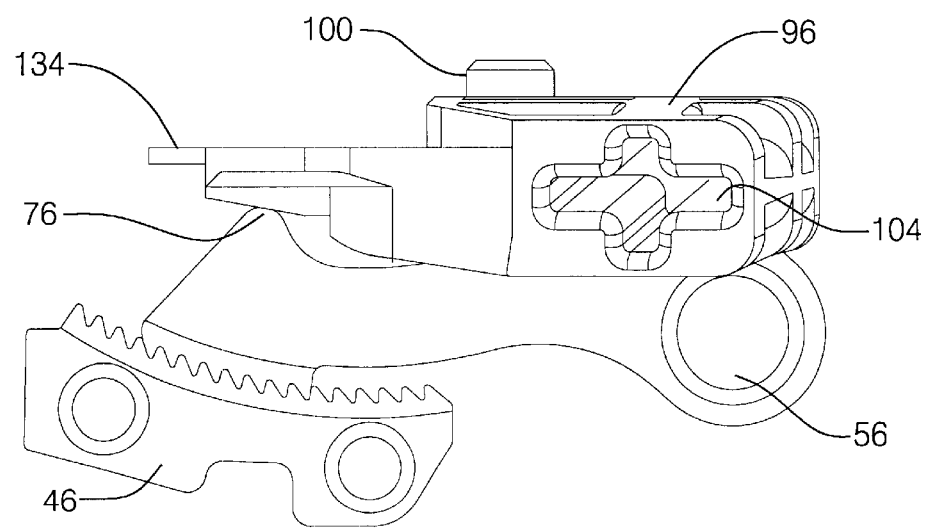
Figure 9:
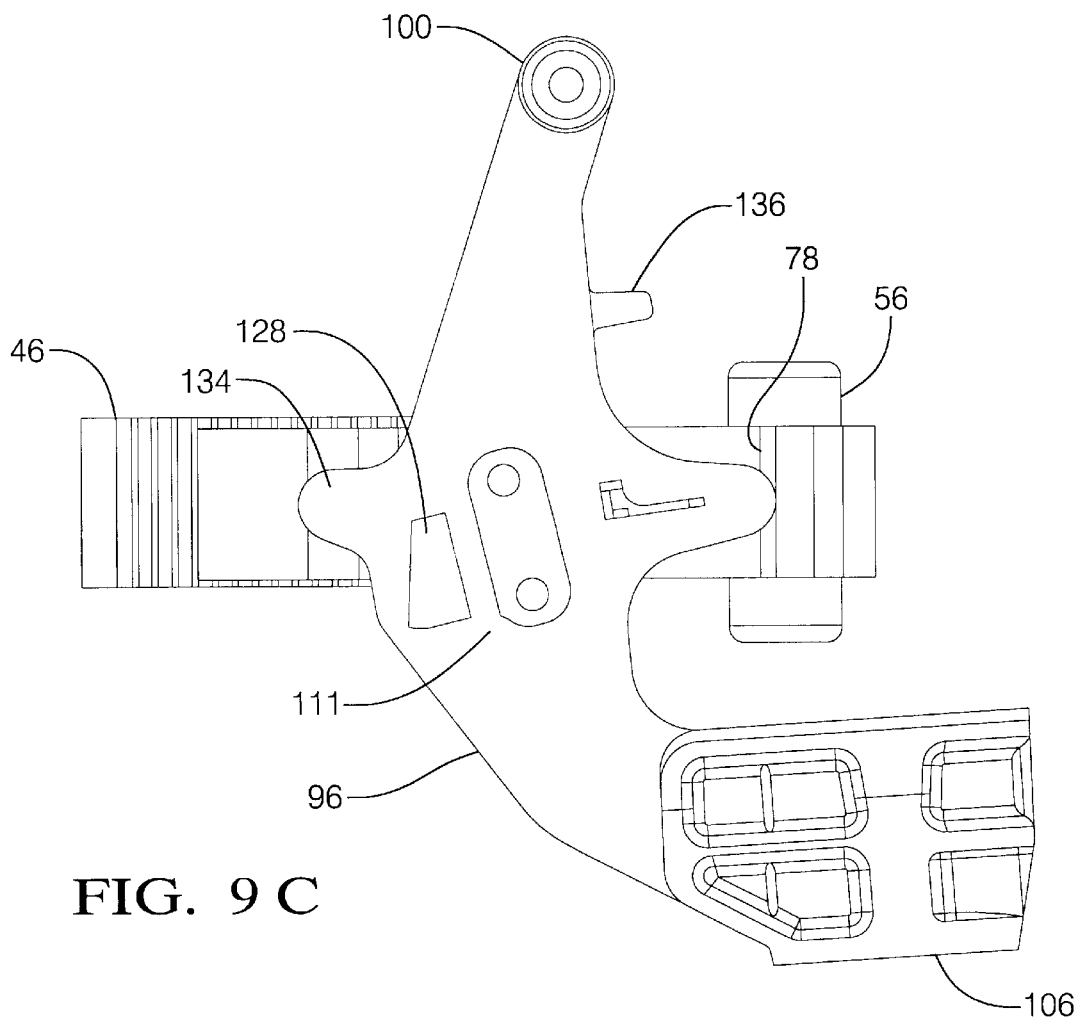
Figure 9:
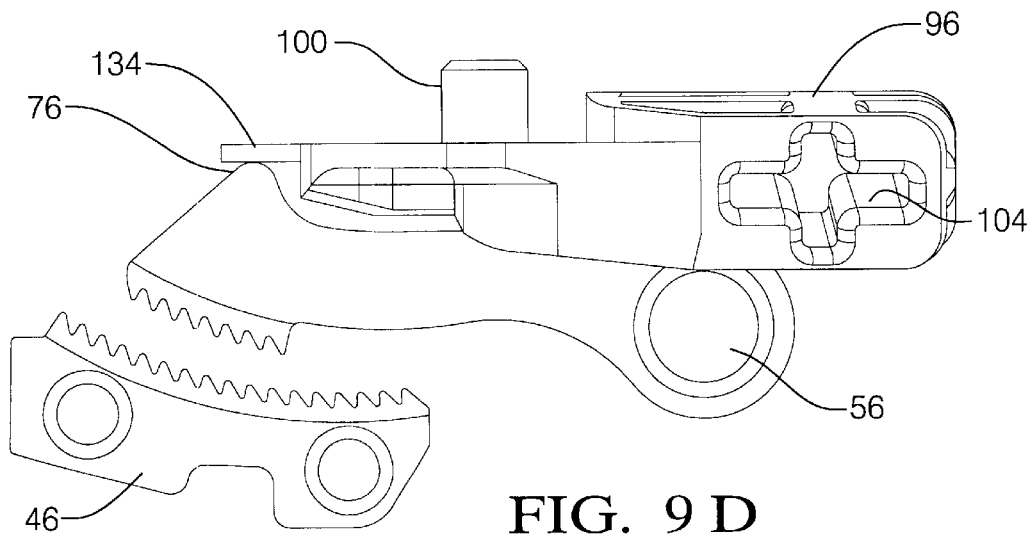

The purpose of the spring 107 is to maintain contact between the cam lobe 76 and the shoe release lever 96, move the pivoted teeth 74 out of engagement of the fixed teeth 52 to permit tilt adjustment, and to urge the shoe release lever 96 toward the shoe locked position as shown in FIGS. 9a and 9b. If the compression spring 107 is sufficiently strong it can move the pivoted teeth out of mesh with the fixed teeth 52 for adjustment and also move the shoe release lever 96 to a locked position. The auxiliary compression spring 138 if used ensures that the shoe release lever 96 moves to a locked position when released by a vehicle operator and permits the use of a relatively weak spring 107 to reduce the force exerted on the shoe release lever by the cam lobe 76. Reduced cam lobe force can reduce noise and wear while making upper steering shaft adjustments. After the shoe release lever 96 is pivoted to an unlocked and released position, the tilt housing 12 can be pivotally attached to the fixed housing 14.

The shoe release lever 96 can be installed as explained above and the springs 107 and 138 can be compressed manually without the requirement to use tools or assembly fixtures.

A release lever guide 144 of the tilt housing 12 has a lower release lever guide surface 146 that is parallel to and spaced from the shoe release lever guide surface 142. These guide surfaces 142 and 146 cooperate with each other to guide the free end 106 of the shoe release lever 96 in a plane that is perpendicular to the trunion axis 103. A slot 148 is formed by the guide surfaces 142 and 146 which has a closed end 150 and an open end opposite the closed end. The open end of the slot 148 permits pivotal movement of the shoe release lever 96 about the trunion axis 103 and into the slot 148 during assembly.

The tilt housing 12 is pivotally attached to the fixed housing 14 after the shoe release lever 96 is attached to the tilt housing as explained above.

During operation of the steering column tilt assembly 10, the spring 107 urges the shoe release lever 96 to pivot about the trunion axis 103 and urges the wedge insert 120 forward. Forward movement of the wedge insert 120 moves the wedge surface 132 into contact with the cam lobe 76, as shown in FIG. 1, pivots the pivoted shoe about the pivoted shoe axis 80 and forces the pivoted teeth 74 into engagement with the fixed teeth 52. The surfaces 126 and 128 of the wedge insert 120 slide along a shoe release lever guide surface 142 on the tilt housing 12. This guide surface 142 and the wedge insert 120 maintain engagement between the fixed teeth 52 and the pivoted teeth 74 when the wedge insert 120 is in the forward locking position. Manual movement of free end 106 of the shoe release lever 96 toward the rear, pivots the lever about the trunion axis 103, moves the wedge surface 132 of the wedge insert 120, and frees the pivoted shoe 54 to pivot about the shoe axis 80. The spring 107 and the force pin 108 act on the stop arm 78 and urge the cam lobe 76 toward the wedge surface 132. After the shoe release lever 96 has been pivoted to the rear a sufficient distance, the pivoted teeth 74 disengage from the fixed teeth 52 and the tilt housing 12 is free to pivot about the tilt axis 20 to a new position. The noise reduction tab 134 is contacted by the cam lobe 76 as shown in FIG. 9d, when the shoe release lever 96 is in an unlocked position. The tab 134 is a composite material that dampens noise and also limits the distance the pivoted teeth 74 move.

The shoe release lever 96 is released after the tilt housing is pivoted about the tilt axis 20 to a desired position. The shoe release lever 96 is then returned to the locked position by the spring 107 and the force pin 108 and by the auxiliary compression spring 138.

Obviously, many modifications and variation of the present invention are possible in light of the above teachings. It is, therefore, to be understood that within the scope of the appended claims, the invention may be practiced otherwise than as specifically described. The invention is defined by the claims.

What is claimed is:

1. A steering column tilt assembly comprising:

a fixed housing;

a tilt housing pivotally attached to said fixed housing for pivotal movement about a tilt axis;

a fixed shoe attached to the fixed housing;

a pivoted shoe pivotally attached to said tilt housing for pivotal movement about a shoe pivot axis that is parallel to the tilt axis;

a shoe release lever having a pivoted end shank portion with an integral bottom trunion and an integral top trunion that is coaxial with a bottom trunion and a trunion axis, a center section with the integral shoe wedge surface, and a handle end;

a shoe release lever slot in said tilt housing, a release lever bore in said tilt housing that includes an upper bore portion on a first side of the shoe release lever slot that receives the integral top trunion and a lower bore portion on a second side of the shoe release lever slot that receives the integral bottom trunion and wherein the lower bore portion has an open quadrant that permits passage of the pivoted end shank portion into the shoe release lever slot; and at least one spring that urges the shoe release lever to pivot about the trunion axis toward a shoe lock position in which the shoe wedge surface engages the pivoted shoe and holds the pivoted shoe in engagement with the fixed shoe.

2. A steering column tilt assembly as set forth in claim 1 wherein the fixed shoe has a plurality of fixed teeth and a pivoted shoe has a plurality of pivoted teeth.

3. A steering column tilt assembly as set forth in claim 2 wherein at least some of the plurality of fixed teeth are in engagement with at least some of the plurality of the pivoted teeth when the pivoted shoe is in the shoe locked position.

4. A steering column tilt assembly as set forth in claim 1 wherein the at least one spring also urges the pivoted shoe to pivot about the shoe pivot axis away from the fixed shoe.

5. A steering column tilt assembly as set forth in claim 1 including a second spring that urges the shoe release lever to pivot about the trunion axis toward the shoe locked position.

6. A steering column tilt assembly as set forth in claim 1 including a shoe release lever guide surface on said tilt housing that limits movement of the shoe wedge surface in a direction parallel to the trunion axis and away from the pivoted shoe.

7. A steering column tilt assembly as set forth in claim 6 including a lower release lever guide surface on said tilt housing that limits movement of the shoe wedge surface in a direction parallel to the trunion axis and toward the pivoted shoe and wherein the lower release lever guide surface and the shoe release lever guide surface cooperate with each other to form a second shoe release lever slot that receives the shoe release lever.

8. A steering column tilt assembly comprising:

a tilt housing having an upper steering shaft axis;

a fixed housing;

a pair of housing pins and pivotally attaching said tilt housing to said fixed housing for pivotal movement about a tilt axis;

a fixed shoe attached to said fixed housing and having a plurality of fixed teeth;

a pivoted shoe pivotally attached to said tilt housing and having a plurality of pivoted teeth that are pivotal into and out of engagement with the plurality of fixed teeth;

a shoe release lever having a pivot end shank portion with an integral bottom trunion and an integral top trunion that is coaxial with the integral bottom trunion and a trunion axis, a center section with an integral shoe wedge surface, and a handle end;

a shoe release lever slot in said tilt housing, a release lever bore in said tilt housing that has an upper bore portion on a first side of the release lever slot that receives the integral top trunion and a lower bore portion on a second side of the release lever slot that receives the integral bottom trunion and wherein the lower bore portion as an open quadrant that permits passage of the pivoted end shank portion into the shoe release lever slot; and at least one spring that urges the shoe release lever to pivot about the trunion axis toward a shoe locked position in which the integral shoe wedge surface engages the pivoted shoe and the plurality of pivoted teeth are held in engagement with the plurality of fixed teeth.

9. A steering column tilt assembly as set forth in claim 8 including a second shoe release lever slot in said tilt housing that receives and guides the center section of the shoe release lever.

10. A steering column tilt assembly method of assembly comprising:

pivotally attaching a pivoted shoe to a tilt housing;

axially aligning a top trunion and a bottom trunion of a shoe release lever with an upper bore portion and a lower bore portion in the tilt housing and simultaneously aligning a pivoted end shank portion of the shoe release lever with an open quadrant of the lower bore portion;

moving the top trunion axially into the upper bore portion and simultaneously moving the pivoted end shank portion through the open quadrant;

pivoting the shoe release lever about a trunion axis to move the pivoted end shank portion into a release lever pivoted end slot in the tilt housing between the upper bore portion and the lower bore portion and simultaneously compressing a first compression spring that urges the shoe release lever toward a shoe locked position;

and pivotally attaching a fixed housing to the tilt housing.

\* \* \* \* \*